US009444365B2

(12) United States Patent
Bock et al.

(10) Patent No.: US 9,444,365 B2
(45) Date of Patent: Sep. 13, 2016

(54) TRACKING METHOD AND TRACKING DEVICE FOR A VOLTAGE CONVERTER FOR A PHOTOVOLTAIC SYSTEM

(71) Applicant: SMA Solar Technology AG, Niestetal (DE)

(72) Inventors: Martin Bock, Edertal (DE); Tobias Mueller, Escherode (DE); Thomas Ortmann, Kassel (DE); Alexander Unru, Niestetal (DE)

(73) Assignee: SMA SOLAR TECHNOLOGY AG, Niestetal (DE)

( * ) Notice: Subject to any disclaimer, the term of this patent is extended or adjusted under 35 U.S.C. 154(b) by 223 days.

(21) Appl. No.: 14/260,741

(22) Filed: Apr. 24, 2014

(65) Prior Publication Data
US 2014/0233263 A1 Aug. 21, 2014

Related U.S. Application Data

(63) Continuation of application No. PCT/EP2012/070991, filed on Oct. 23, 2012.

(30) Foreign Application Priority Data

Oct. 28, 2011 (DE) .................. 10 2011 054 939

(51) Int. Cl.
*G05F 1/67* (2006.01)
*H02M 7/42* (2006.01)
(Continued)

(52) U.S. Cl.
CPC .................. *H02M 7/42* (2013.01); *G05F 1/67* (2013.01); *Y02E 10/58* (2013.01)

(58) Field of Classification Search
CPC ........... G05F 1/67; H02M 7/42; H02M 7/44; H02M 7/48; H02M 7/53; H02M 7/537; Y02E 10/58; Y02E 10/56; Y02E 10/563
USPC ....................................... 363/44, 48, 53, 537
See application file for complete search history.

(56) References Cited

U.S. PATENT DOCUMENTS 5,268,832 A * 12/1993 Kandatsu .................. G05F 1/67
323/299
5,892,354 A 4/1999 Nagao et al.
(Continued)

FOREIGN PATENT DOCUMENTS

CN         102170142 A  *  8/2011
DE         19961705 A1     7/2001
EP         2107672 A1     10/2009

OTHER PUBLICATIONS

Machine English Translation of CN102170142, Aug. 31, 2011.*
(Continued)

*Primary Examiner* — Timothy J Dole
*Assistant Examiner* — Sisay G Tiku
(74) *Attorney, Agent, or Firm* — Eschweiler & Associates, LLC (57) ABSTRACT

The disclosure relates to a tracking method for a voltage transformer, in particular an inverter, of a photovoltaic system. In the method, an intermediate circuit voltage is repeatedly decreased or increased in one direction to a lower or higher voltage by voltage steps of a specified magnitude. The method is characterized in that an average rate of change of the intermediate circuit voltage in a partial time period between two voltage steps is limited by a maximum average rate of change, the maximum average rate of change being defined according to the magnitude of the intermediate circuit voltage. The disclosure further relates to a tracking device designed to perform the tracking method and to an inverter equipped with the tracking device.

17 Claims, 4 Drawing Sheets

(51) Int. Cl.
*H02M 7/44* (2006.01)
*H02M 7/48* (2007.01)
*H02M 7/53* (2006.01)
*H02M 7/537* (2006.01)

(56) References Cited

U.S. PATENT DOCUMENTS

| 7,158,395 | B2* | 1/2007 | Deng | G05F 1/67 363/95 |
| 8,189,352 | B2* | 5/2012 | Egiziano | G05F 1/67 323/207 |
| 9,130,401 | B2* | 9/2015 | Adest | H01L 31/02021 |
| 2005/0110454 | A1 | 5/2005 | Tsai et al. | |
| 2009/0244936 | A1 | 10/2009 | Falk et al. | |

OTHER PUBLICATIONS

Jain, et al. "Comparison of the Performance of Maximum Power Point Tracking Schemes Applied to Single-Stage Grid-Connected Phohtovoltaic Systems." IET Electrical Power Applications, 1, (5), pp. 753-762. Published in 2007.

International Search Report dated Jun. 11, 2013 for International Application No. PCT/EP2012/070991.

\* cited by examiner

TRACKING METHOD AND TRACKING DEVICE FOR A VOLTAGE CONVERTER FOR A PHOTOVOLTAIC SYSTEM

REFERENCE TO RELATED APPLICATIONS

This application is a continuation of International application number PCT/EP2012/070991 filed on Oct. 23, 2012, which claims priority to German application number 10 2011 054 939.0, filed on Oct. 28, 2011.

FIELD

The disclosure relates to a tracking method for a voltage converter, in particular an inverter, of a photovoltaic system, for tracking a working point of a PV generator, in which method an intermediate circuit voltage is changed by a voltage increment of a predetermined level in a direction towards a lower or higher voltage. The disclosure further relates to a tracking device and to an inverter comprising a tracking device.

BACKGROUND

Inverters are used in photovoltaic systems for converting a direct current generated by a photovoltaic generator into alternating current, which can be fed, single-phase or polyphase, into a public or private power supply grid. In the context of the application, a photovoltaic generator, referred to below as a PV generator for short, should be understood to mean any arrangement comprising photovoltaic modules (PV modules), in particular, an arrangement in which a plurality of PV modules are connected in series to form a so-called string.

Inverters or more generally voltage converters of a PV system generally comprise a tracking device for the working point of the PV generator connected to them, the so-called MPP (Maximum Power Point) tracker. By means of the MPP tracker, the PV generator is operated at a working point at which the maximum electrical power is output. This optimum working point, also referred to as MPP working point, is dependent on the respective PV generator and its operating parameters, for example the intensity of the solar radiation and the temperature of the PV generator. Furthermore, the working point shifts towards lower voltages over the course of the life of PV generators as a result of their aging response (degradation).

A summary of various MPP tracking methods can be found in the article "Comparison of the performance of maximum power point schemes applied to single-stage grid-connected photovoltaic systems", S. Jain and V. Agarwal, IET Electr, Power Appl., 2007. In the case of a frequently used tracking method, the voltage at the input of the voltage converter, which is also referred to as the intermediate circuit voltage in particular in the case of single-stage inverters, i.e. inverters which only have a converter stage in the form of an inverter bridge, is increased or decreased by increments, wherein, with each increment, a change in the power generated by the PV generator and converted by the inverter which is associated with this increment is determined. As long as the power increases, the change in voltage generally goes in the direction of the optimum working point. Correspondingly, for a subsequent variation increment, the direction of the change in voltage (increase/reduction) can be maintained. If, on the other hand, the power is reduced in the event of a variation in the intermediate circuit voltage, the direction of the subsequent increment can be reversed. In this way, the intermediate circuit voltage follows or fluctuates around the voltage at the optimum working point.

A modification to such a tracking method is known from the document U.S. 2005/0110454 A1. In this case, it is not the power that is generated by the PV generator that is considered, but the power which is output by the inverter of the PV system. The document DE 19961 705 A1 describes an inverter, in which the working point of the PV generator is set both in respect of maximization of the output power of the PV generator and in respect of the level of the output voltage of the inverter.

In the case of single-stage inverters, a change in the working voltage of the PV generator is performed by a variation in the voltage conversion ratio between the input-side intermediate circuit voltage and the output-side mains voltage of the inverter bridge. Such a variation in the voltage transformation ratio can be performed, for example, by different switching parameters of switches in the inverter bridge (for example switching duration, duty factor, phase angle of the switching operation in relation to the phase angle of the AC voltage). The variation range of the voltage transformation ratio is in this case relatively restricted.

In particular, a lower voltage limit is provided for the intermediate circuit voltage of an inverter or voltage converter which needs to be exceeded in order to establish a power flow from the PV generator into the energy supply grid.

It is known from the prior art, for example, from the document EP 2 107672 10 A1, to determine the minimum required intermediate circuit voltage of the inverter and therefore the lower input voltage limit of a single-stage inverter computationally on the basis of a measured voltage of the energy supply grid and the known maximum voltage transformation ratio. In practice, known MPP tracking methods do not, however, use the working voltage range up to this computationally determined lower input voltage limit. In the document EP 2 107 672 A1 mentioned above, for example, a control reserve is described which is added to the computationally determined lower input voltage limit. The reason for this is that, in the vicinity of this limit, for example, owing to the voltage regulation mechanisms of the input voltage, there is the risk of the minimum required intermediate circuit voltage temporarily being undershot, which would result in distortions in the signal waveform of the fed-in alternating current. Therefore, the minimum required input voltage has a reserve applied to it in order to safely avoid such distortions.

SUMMARY

Multi-stage inverters have a larger variation range of the voltage conversion ratio. In the case of a multi-stage inverter, a DC-to-DC converter is connected upstream of the inverter bridge and introduces an additional conversion ratio between the input voltage and the intermediate circuit voltage. The DC-to-DC converter also has variation possibilities in terms of its voltage conversion ratio which, combined with the variation range of the voltage conversion ratio of the inverter bridge, results in an overall relatively large variation range. Such a multi-stage inverter is more complex in terms of circuitry, however, and is therefore more costly and is typically subjected to higher converter losses owing to the additional converter stage. In principle, in addition in this case too, there is the problem or the restriction that the input voltage range available towards low voltages cannot be exhausted by known tracking methods up to the computationally determined lower input voltage limit.

Therefore, one embodiment of the present invention comprises providing a tracking method of the type mentioned at the outset in which the input voltage range of a voltage converter can be exhausted as near as possible to the computationally determined lower input voltage limit. A further embodiment of the invention comprises providing a corresponding tracking device and an inverter equipped therewith.

In accordance with a first embodiment, a tracking method for a voltage converter, in particular an inverter, of a photovoltaic system is disclosed. In the method an intermediate circuit voltage is changed repeatedly by voltage increments of a predetermined level in a direction towards a lower or higher voltage. The method further comprises limiting a mean rate of change of the intermediate circuit voltage in a subperiod between two voltage increments by a maximum mean rate of change, wherein the maximum mean rate of change is determined depending on the level of the intermediate circuit voltage.

Limiting the rate of change has the effect that a control loop which is used for setting the intermediate circuit voltage $U_{ZW}$ can follow a predetermined setpoint value without any overshoots. This makes it possible to prevent possible undershooting of a lower input or intermediate circuit voltage limit even when the tracking method tracks the intermediate circuit voltage close to this limit. The input voltage range available can therefore be completely utilized towards the bottom of this range. At the same time, owing to the dependence of the maximum mean rate of change on the level of the intermediate circuit voltage it is possible to achieve that a quicker adjustment of the intermediate circuit voltage can take place in a noncritical range of the intermediate circuit voltage, as a result of which a good response of the tracking method to a changing working point of the PV generator is ensured in this range.

In an advantageous configuration of the tracking method, the maximum mean rate of change is determined depending on the level of a voltage difference between the intermediate circuit voltage and a minimum required intermediate circuit voltage. In one embodiment, the maximum mean rate of change decreases as the level of the voltage difference decreases. In another embodiment, it is constant above a fixed intermediate circuit voltage. In this way, the rate of change is changed in particular in the critical lower region of the intermediate circuit voltage such that the predetermined setpoint value can be followed without any overshoots.

In further advantageous configurations of the tracking method, the minimum required intermediate circuit voltage is determined on the basis of a mains voltage and possibly in addition on the basis of a feed-in current. In this way, the lower limit of the voltage range can be matched precisely to the energy supply grid and possibly additionally to feed-in conditions. In one embodiment, the minimum required intermediate circuit voltage is updated regularly. In another embodiment, this updating of the minimum required intermediate circuit voltage is performed more frequently than the voltage increments by a multiple. This ensures that the tracking method at any time operates with up-to-date values of the minimum required intermediate circuit voltage.

In a further advantageous configuration of the tracking method, the maximum mean rate of change is determined by means of an update rate for control of a current fed-in by the inverter into an AC voltage grid. This is also used for operating the tracking method always with up-to-date parameters.

In further advantageous configurations, the level of the voltage increments is determined depending on the level of the intermediate circuit voltage, and/or the setpoint value for the intermediate circuit voltage is predetermined as a continuous function, for example, as a ramp function, with a finite rate of change, and/or an update rate for control of a current fed-in by the inverter into an AC voltage grid is matched. The mentioned configurations represent suitable possibilities for influencing the rate of change and ensuring that the mean rate of change remains below the maximum mean rate of change.

In accordance with another embodiment, a tracking device for a voltage converter which is configured to perform the above-described tracking method is disclosed. In accordance with another embodiment, an inverter, in particular a single-stage inverter, comprising such a tracking device is disclosed. The same advantages result as are achieved with the first aspect.

BRIEF DESCRIPTION OF THE DRAWINGS

The disclosure will be explained in more detail below with reference to six figures, in which.

DETAILED DESCRIPTION

Figure 1:
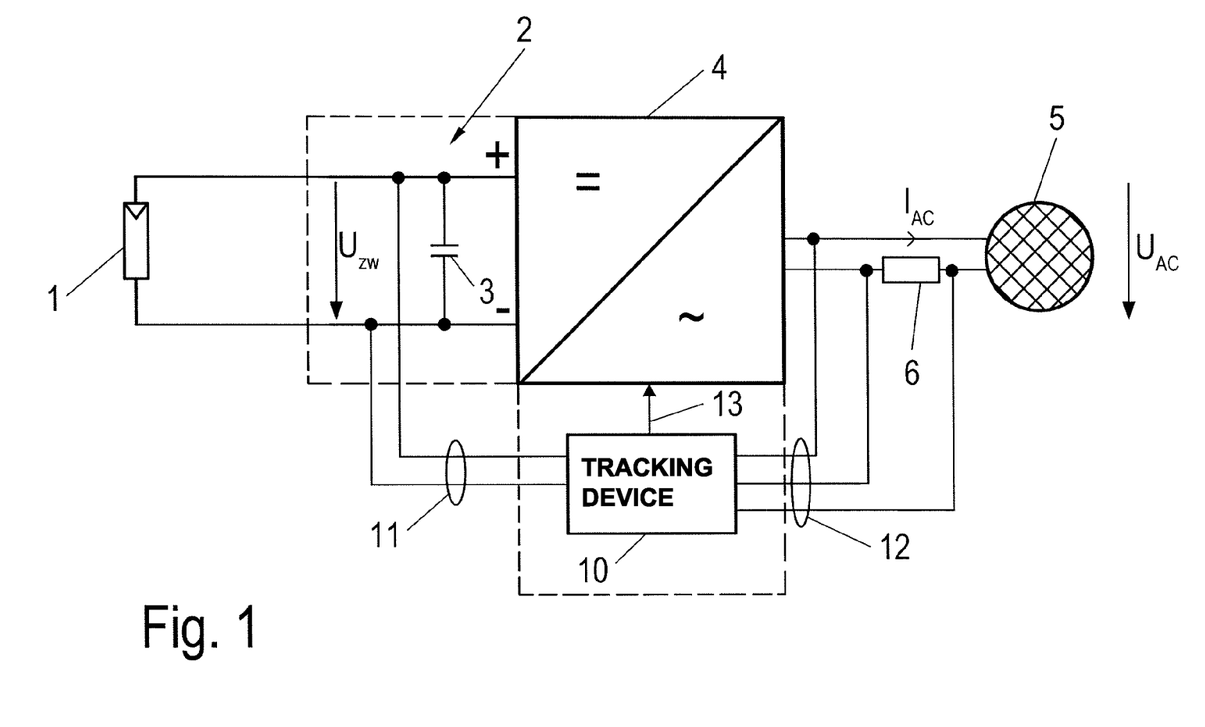
FIG. 1 shows a photovoltaic system in a block circuit diagram.

FIG. 1 shows a photovoltaic system, referred to below as PV system for short, in a schematic block circuit diagram. The PV system comprises a photovoltaic generator 1 (PV generator 1), which is connected to an intermediate circuit 2 via DC lines. For example, the PV generator 1 in FIG. 1 is symbolized by the circuit symbol for a single photovoltaic cell. In an embodiment of the PV system illustrated, the PV generator 1 may be a single PV module which has a multiplicity of cells or an interconnected system of a plurality of PV modules in particular connected in series to form a string or to form a plurality of strings connected in parallel.

The intermediate circuit 2 comprises at least one intermediate circuit capacitor 3. The voltage present in the intermediate circuit 2, which voltage is equal to the input voltage and therefore the voltage at the PV generator 1, apart from cable losses, in the example illustrated, will be referred to below as the intermediate circuit voltage $U_{ZW}$. The PV generator 1 is connected to DC inputs of an inverter 4 via the intermediate circuit 2. As is indicated by the dashed extension of the symbol of the inverter 4 towards the left in FIG. 1, the intermediate circuit 2 can in this case also be integrated in the inverter 4. The inverter 4 generally does not subject the intermediate circuit 2 to a continuous load. The reason for this is, for example, a noncontinuous power flow in the case of an output alternating current or else pulsed switching of power semiconductor switches in the inverter 4. The intermediate circuit capacitor 3 is used for smoothing the intermediate circuit voltage $U_{ZW}$ and keeps voltage dips in the intermediate circuit voltage $U_{ZW}$, which occur owing to the noncontinuous current withdrawal, as low as possible, as a result of which a high average power withdrawal from the intermediate circuit 2 and therefore from the PV generator is possible.

For the text below, it is assumed that the inverter 4 is a single-stage inverter. The tracking method according to the application and the tracking device can likewise be used together with a multi-stage inverter or in principle with any voltage converter connected to a PV generator, however. Of particular advantage is, however, the use with a single-stage inverter since in this case the available input voltage range is generally subject to the greatest restrictions in particular owing to a minimum required intermediate circuit voltage.

In the example embodiment illustrated, the intermediate circuit capacitor 3 is arranged in the DC input circuit of the inverter 4. In the case of inverters which have a multi-stage design and which also have a DC-to-DC converter in addition to an inverter bridge, such a (buffer) capacitor can alternatively be provided at the output of the DC-to-DC converter. Irrespective of this, in the context of the application, in general the circuit in which the (buffer) capacitor is arranged is referred to as the intermediate circuit and the DC voltage at the capacitor 3 is referred to as the intermediate circuit voltage $U_{ZW}$.

The inverter 4 has an AC output, via which the inverter 4 is connected to a single-phase or polyphase energy supply grid 5. The energy supply grid 5 can be a public supply grid or a private supply grid (island mode). By way of example, the inverter 4 is designed to have only two AC outputs for a single-phase feed-in into the energy supply grid 5. It goes without saying that a design other than the single-phase design of the inverter 4 illustrated is also possible, for example a three-phase design.

FIG. 1 shows merely the elements of the PV system which are essential in the context of the application. For example, switching elements (for example disconnectors), filters (for example sinusoidal filters), grid monitoring devices and/or transformers, none of which are illustrated, can be provided on the AC side of the inverter 4. Likewise, elements such as, for example, fuse elements or switching elements, for example, load disconnectors or DC contactors, which are not illustrated here can be arranged on the DC side in the connection between the PV generator 1 and the intermediate circuit 2 or the inverter 4.

The voltage of the phase or phases on which the inverter 4 is fed into the energy supply grid 5 is referred to below as the mains voltage $U_{AC}$. Apart from any low transmission losses between the inverter 4 and the energy supply grid 5, the mains voltage $U_{AC}$ corresponds to the voltage present at the AC voltage outputs of the inverter 4. The current flowing from the inverter 4 into the energy supply grid 5 during feed-in operation is referred to below as the feed-in current $I_{AC}$. As is symbolized by a measuring resistor 6 arranged between the inverter 4 and the energy supply grid 5, a measurement possibility for the feed-in current $I_{AC}$ is provided. It goes without saying that this measurement possibility, for example, the measuring resistor 6, can also be integrated in the inverter 4. In addition to the measuring resistor 6 illustrated, a current measurement can also take place via other known current sensors, for example, via an inductive current sensor or via a Hall sensor.

Furthermore, the PV system comprises a tracking device 10, which has inputs 11 and 12 via which the tracking device 10 can determine the intermediate circuit voltage $U_{ZW}$, the mains voltage $U_{AC}$ and the feed-in current $I_{AC}$. Furthermore, the tracking device 10 is connected to the inverter 4 via a control output 13. The tracking device 10 can input the setpoint value for the intermediate circuit voltage $U_{ZW}$ to the inverter 4 via the control output 13. In this case, this setpoint value of the intermediate circuit voltage $U_{ZW}$ is determined in such a way that the PV generator 1 is operated at a working point at which it outputs a maximum power or at which the inverter 4 is capable of feeding a maximum electrical power into the energy supply grid 5 as far as possible. It goes without saying that, instead of the input of the setpoint value of the intermediate circuit voltage $U_{ZW}$, another electrical characteristic for the inverter 4 can also be input, which equally results in setting of the desired working point of the PV generator 1. For example, a setpoint value for a current provided by the PV generator 1 can also be used. If tracking methods for setting the optimum working point of the PV generator 1 are described below by way of example using a setpoint value input for the intermediate circuit voltage $U_{ZW}$, the method according to the application is not restricted to this, but can be transferred correspondingly to the setpoint values of other electrical characteristics. As is indicated by the dashed extension of the symbol of the inverter 4 at the bottom in FIG. 1, the tracking device 10 can be integrated in the inverter 4.

Figure 2:
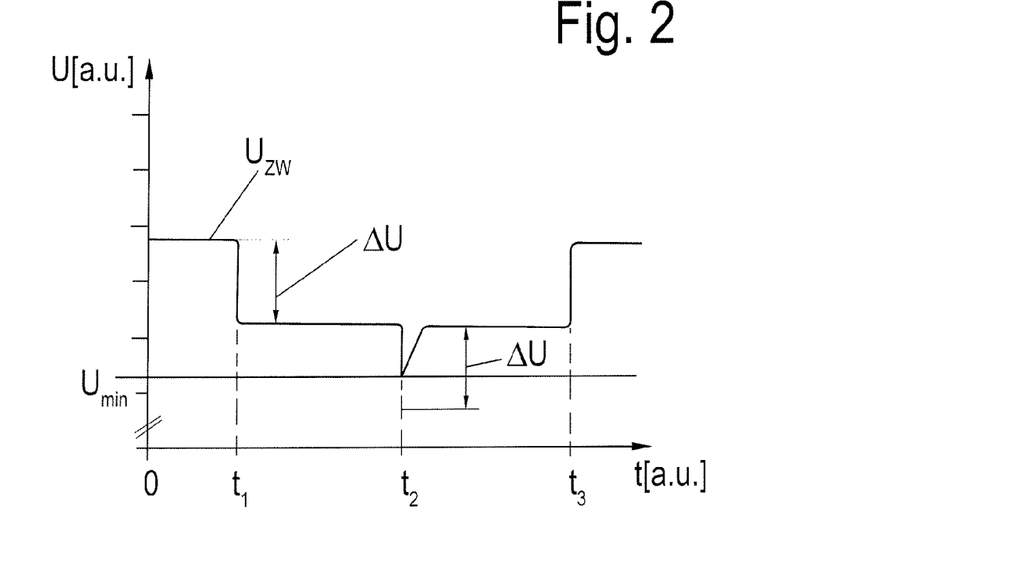
FIG. 2 shows a schematic illustration of a course of an intermediate circuit voltage in a tracking method according to the prior art.

FIG. 2 shows an example of a course of the intermediate circuit voltage $U_{ZW}$ in a tracking method according to the prior art in a graph. The level of the intermediate circuit voltage $U_{ZW}$ is in this case plotted on the y axis of the graph and the progression of time t is plotted on the x axis of the graph. The two axes show arbitrary units (a.u.). In the known tracking method illustrated, a voltage increment of a predetermined level ΔU in the direction of a higher or lower intermediate circuit voltage is performed starting from an up-to-date value for the intermediate circuit voltage $U_{ZW}$. For the intermediate circuit voltage $U_{ZW}$ thus changed, the power which is produced by the PV generator or else the power which is fed-in by the inverter at this working point of the PV generator into the energy supply grid is determined and compared with the power produced or fed-in prior to the change of the intermediate circuit voltage. If the power has increased by the change of the intermediate circuit voltage $U_{ZW}$, a further voltage increment of the same level ΔU in the same direction (i.e. either an increase or a reduction) is then performed. If, on the other hand, the power has been reduced, an increment in the corresponding other direction is then performed. If the optimum working point changes as a result of changed operating conditions of the PV generator and/or changed radiation conditions over time, the actual working point thus follows the optimum working point or fluctuates around it. Other sequences of voltage increments are also known from the prior art, wherein, in accordance with further criteria and/or complex algorithms, the directions of the changes of the voltage are determined; these methods have the common factor that the predetermined level ΔU of the voltage increments is substantially constant. It goes without saying that such methods can also be used instead of the simplified tracking method proposed here.

In FIG. 2, such a voltage increment of the level ΔU is carried out in this case towards a lower intermediate circuit voltage $U_{ZW}$ at the time $t_1$. It is assumed that the reduction of the intermediate circuit voltage $U_{ZW}$ which has taken place at time $t_1$ has resulted in a higher measured power. Correspondingly, the tracking device 10, at a time $t_2$, initiates a further reduction of the intermediate circuit voltage by the value ΔU. The setpoint value input for this reduction ΔU is illustrated in the graph as a dashed horizontal line starting at time $t_2$. This reduction in the intermediate circuit voltage $U_{ZW}$ by the value ΔU would, however, result in a minimum required intermediate circuit voltage $U_{min}$ being undershot, which voltage $U_{min}$ is required for providing an undistorted AC output voltage for feeding into the energy supply grid 5. The minimum required intermediate circuit voltage $U_{min}$ is also referred to below as minimum voltage $U_{min}$ for short. The value of the minimum voltage $U_{min}$ illustrated as a horizontal line in FIG. 2 in this case is either fixedly predetermined or determined on the basis of measured parameters of the energy supply grid.

Maintaining the criterion whereby the minimum voltage $U_{min}$ should not be undershot by the intermediate circuit voltage $U_{ZW}$ has greater priority than setting an optimum working point by virtue of the tracking device. If, therefore, the inverter initially follows the setpoint value input of the tracking device, the minimum voltage $U_{min}$ is undershot, whereupon the setpoint value output by the tracking device is immediately increased again. In the graph shown in FIG. 2, this is expressed by the spike reaching down to the minimum voltage $U_{min}$ in the profile curve of the intermediate circuit voltage $U_{ZW}$. If the optimum working point is between the intermediate circuit voltage assumed at time $t_1$ and the minimum voltage $U_{min}$, this optimum working point cannot be engaged. This is problematic in particular in the case of single-stage inverters or voltage converters since such inverters or converters, owing to their design, generally do not have a large voltage variation range of the working point as a result of the minimum required intermediate circuit voltage, and this variation range which is inherently not large therefore additionally cannot be exhausted in the known tracking methods.

Figure 3:
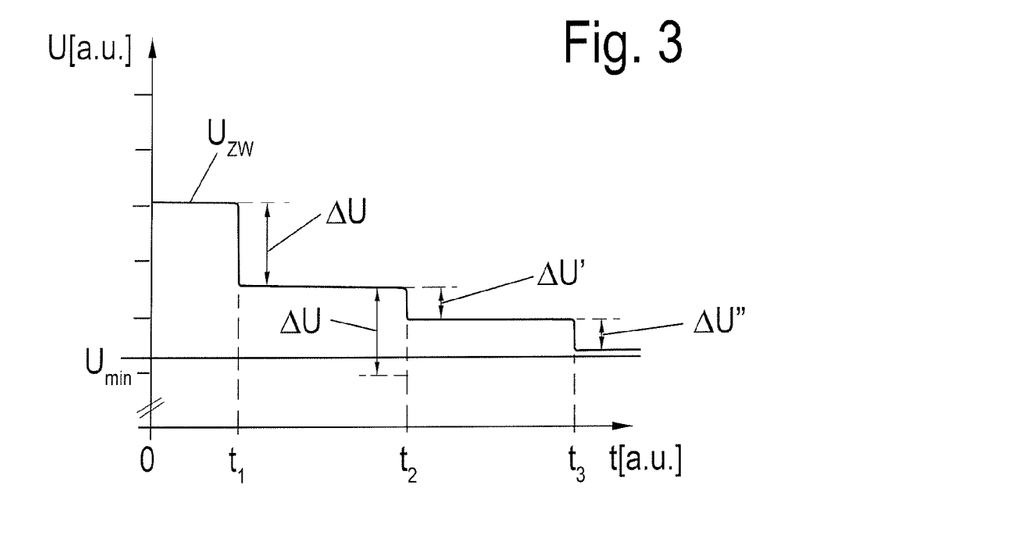
FIG. 3 shows a schematic illustration of a course of an intermediate circuit voltage in a first example embodiment of the tracking method according to the application.

In an analogous manner to FIG. 2, FIG. 3 shows a voltage course of an intermediate circuit voltage $U_{ZW}$ when implementing a tracking method according to the application. The method can be implemented, for example, within the PV system illustrated in FIG. 1 and is therefore described by way of example with reference to the example embodiment shown in FIG. 1 and using the reference symbols used in that context.

First, at a time $t_1$, in the same way as in the method in FIG. 2, a reduction of the intermediate circuit voltage $U_{ZW}$ by a voltage increment of the level ΔU is performed. Again it is assumed that the reduction performed in the intermediate circuit voltage $U_{ZW}$ at time $t_1$ has a positive effect on the measured power. Therefore, at time $t_2$, a further increment is performed so as to reduce the intermediate circuit voltage $U_{ZW}$. However, this reduction is not performed by the same increment ΔU as at time $t_1$, but by a smaller increment ΔU'/<ΔU since a reduction by the increment ΔU would already harbor the risk of undershooting the minimum voltage $U_{min}$. In other words, the mean rate of change |ΔU'/Δt| in the case of the voltage increment at time $t_2$ is reduced in comparison with the corresponding mean rate of change |ΔU/Δt| in the case of the voltage increment at time $t_1$. At in this case denotes a period of finite value which is around the corresponding time of the voltage increment. Δt is in this case not infinitesimally small, but selected to be less than or equal to the difference $(t_2-t_1)$.

At a third time $t_3$, a further reduction is performed, this time through an increment of ΔU", by means of which a further approximation to the minimum voltage $U_{min}$ is achieved without this value being undershot. In principle, in this case the increment ΔU" can have the same value as the increment ΔU'. However, it can also have a different value, for example by virtue of the increment decreasing continuously, at least below a predetermined limit value, as the interval between the intermediate circuit voltage $U_{ZW}$ and the minimum voltage $U_{min}$ decreases.

The tracking method illustrated achieves improved utilization of the voltage variation range by virtue of the fact that the level of the voltage increments ΔU performed during the tracking method is not constant over the entire voltage range of the intermediate circuit voltage $U_{ZW}$ but depending on the level of the intermediate circuit voltage $U_{ZW}$ or depending on the differential voltage between the intermediate circuit voltage $U_{ZW}$ and the minimum voltage $U_{min}$.

Figure 4:
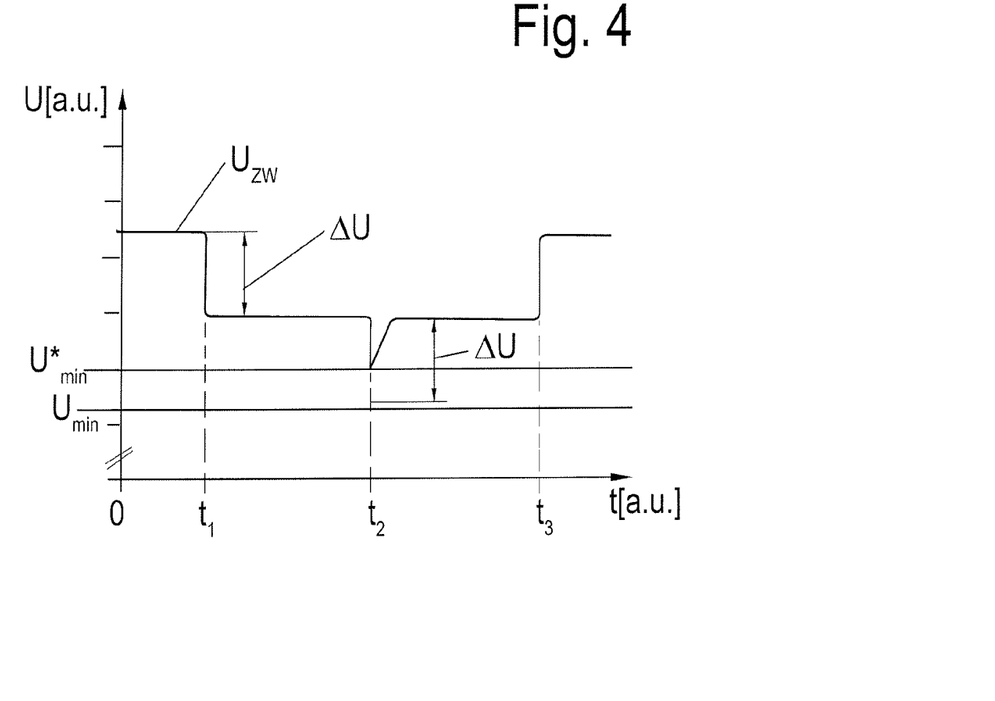
FIG. 4 shows a schematic illustration of a course of an intermediate circuit voltage in a further tracking method according to the prior art.

FIG. 4 illustrates a further problem which can occur in the case of a tracking method known from the prior art as has been described in connection with FIG. 2. In turn, at a first time $t_1$, a reduction of the intermediate circuit voltage $U_{ZW}$ by a voltage increment of the level ΔU is performed. As previously, it is assumed that this reduction is associated with an increase of the measured power and, from this, in a subsequent increment, a further reduction of the intermediate circuit voltage $U_{ZW}$ is intended to be performed in order to set the optimum working point of the PV generator. This subsequent reduction is performed at a second time $t_2$, wherein the level of the intermediate circuit voltage $U_{ZW}$ prior to the second time $t_2$ is such that, even after the reduction by a voltage increment of the same level ΔU, the intermediate circuit voltage would still be greater than the minimum voltage $U_{min}$, as is indicated by the dashed horizontal line to the right of time $t_2$. Nevertheless, distortions occur at the AC output of the inverter shortly after time $t_2$, which distortions lead to reversal to the previously set intermediate circuit voltage $U_{ZW}$, i.e., that which is set between times $t_1$ and $t_2$. The reason for this response is the stepwise change in the setpoint value for the intermediate circuit voltage $U_{ZW}$. In order to set the actual intermediate circuit voltage $U_{ZW}$ at the predetermined setpoint value, each inverter, in the same way as every other voltage converter which is used for setting the intermediate circuit voltage $U_{ZW}$ and therefore the working point of the PV generator, has a control loop. In the case of a stepwise reduction of the setpoint value of the intermediate circuit voltage $U_{ZW}$, the intermediate circuit voltage initially likewise decreases very quickly and runs the risk of at least temporarily falling below this setpoint value in the form of an undershoot. Firstly, such an undershoot can already directly lead to the intermediate circuit voltage $U_{ZW}$ temporarily falling below the minimum voltage $U_{min}$ even when new setpoint values for the intermediate circuit voltage are still above the minimum voltage $U_{min}$, which would be associated with a distortion of the AC output voltage of the inverter. However, even if an undershoot to below the minimum voltage $U_{min}$ would not occur, high currents flowing in the intermediate circuit during interception of the intermediate circuit voltage $U_{ZW}$ to the new setpoint value can result in distortions of the signal waveform of the AC output voltage. In the case of the known incremental change of the setpoint value for the intermediate circuit voltage $U_{ZW}$ in known tracking methods, therefore, a sudden change to a value which is still above the minimum voltage $U_{min}$ cannot be implemented. This is symbolized in FIG. 4 by an effective minimum voltage $U^*_{min}$, which is above what until now has been considered the minimum voltage $U_{min}$. By virtue of the consideration of the described transient control effects in the form of the (relatively high)

effective minimum voltage $U^*_{min}$, which arises from the minimum voltage $U_{min}$ plus a reserve, as is necessary in the known tracking method, consequently the usable voltage variation range of the inverter is further restricted at low voltages.

Figure 5:
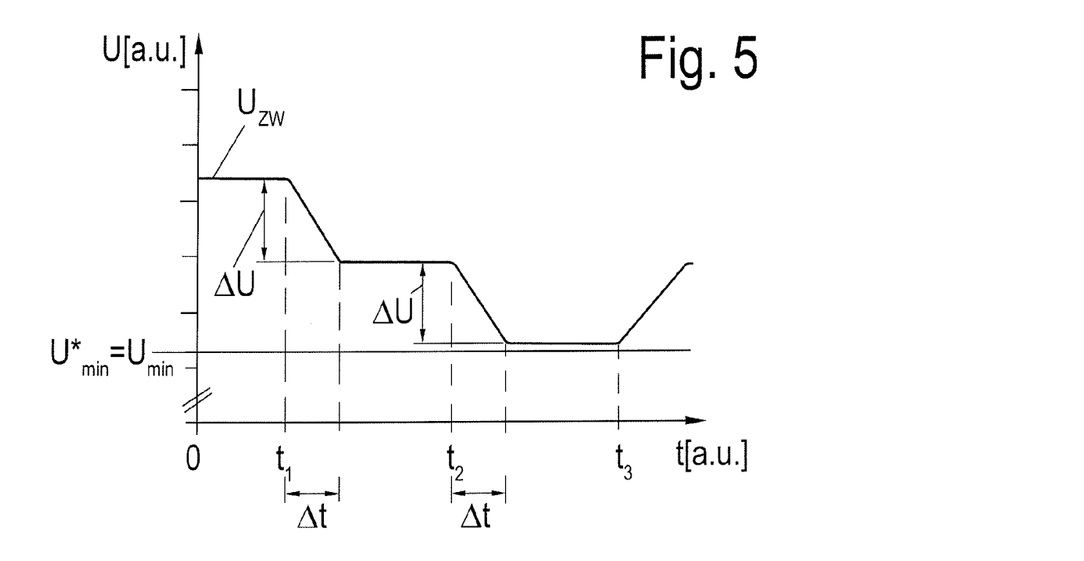
FIG. 5 shows a schematic illustration of a course of an intermediate circuit voltage in a second example embodiment of a tracking method according to the application.

FIG. 5 shows a voltage course of an intermediate circuit voltage $U_{ZW}$ for the implementation of a tracking method in a second example embodiment in accordance with the application in the same way as the previous figures. In this method, too, a variation of the intermediate circuit voltage $U_{ZW}$ is performed, wherein a comparison of the measured feed-in power is used for various voltage increments in order to track the working point of the PV generator at changed conditions.

A first change in voltage by a voltage increment of the level $\Delta U$ is initiated at a first time $t_1$ and at a second time $t_2$. In this case, the new setpoint value for the intermediate circuit voltage $U_{ZW}$ is not predetermined stepwise, however, but by a setpoint value which decreases slowly over a duration $\Delta t$. By way of example, a linearly falling setpoint value course in the form of a ramp is shown in the graph in FIG. 5. The course of the setpoint value input towards the new setpoint value can, however, also follow a different continuous curve which is as smooth as possible or take place in discrete increments, which are substantially smaller than the total level of the voltage increment of the level $\Delta U$ and are predetermined in substantially quicker time sequence, with the result that the level of the temporal rate of change in turn is below a maximum mean rate of change. Such a continuous and slow change in the setpoint value can be followed by the control when setting the intermediate circuit voltage $U_{ZW}$ without any overshoots, and also without unconventionally high currents flowing in the control process, and without distortions occurring.

Alternatively, the described distortions can also be avoided by virtue of the dynamics of the control (control characteristics) in particular of the feed-in current which substantially results from the update rate of the closed-loop control, is reduced in such a way that the control overall operates more slowly. However, this has the disadvantage that there is likewise a slower response to possible dynamic events such as grid faults and should therefore only be used in exceptional cases.

As a result, an intermediate circuit voltage $U_{ZW}$ which is close to the minimum voltage $U_{min}$ can actually also be engaged (cf. in particular the voltage increment at the second time $t_2$). As a result, the effective minimum voltage $U^*_{min}$ approaches the (calculated) minimum voltage $U_{min}$ and falls together with this minimum voltage given a suitable selection of the parameters of the course of the setpoint value input.

It goes without saying that the matching of the level of the voltage increments during the tracking method, as described in connection with FIG. 3, can also be combined with the avoidance, described in connection with FIG. 5, of a sudden change of the setpoint value in the case of the change of the intermediate circuit voltage $U_{ZW}$. Such a combined method is described in FIG. 6 in a further example embodiment in the form of a flowchart.

Figure 6:
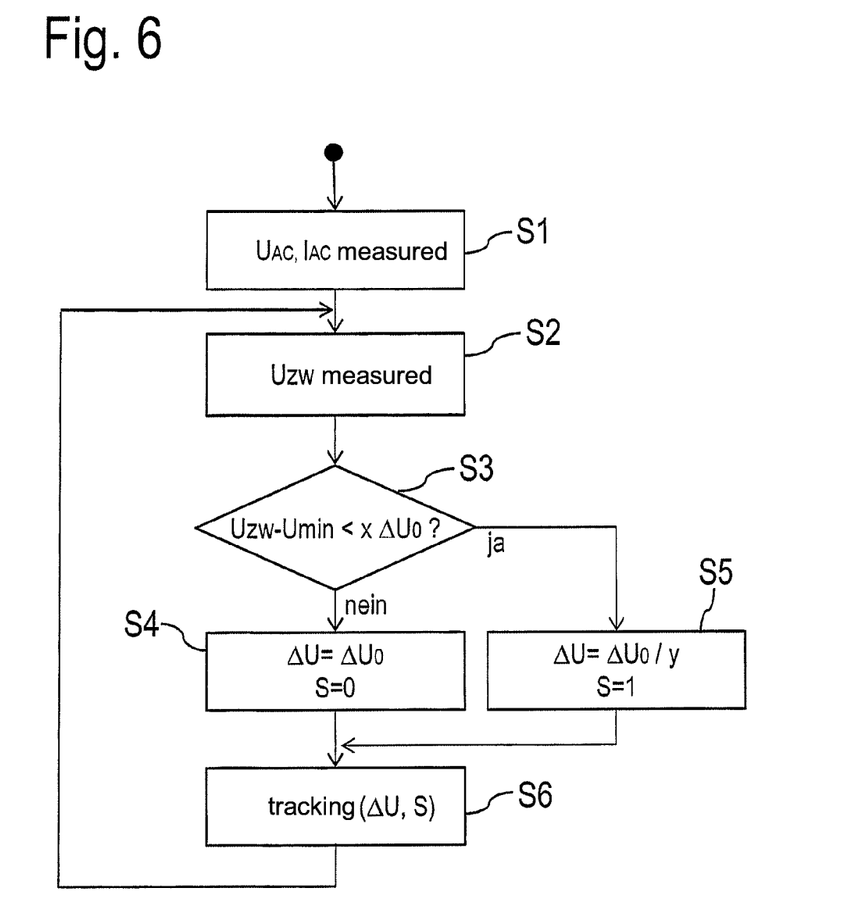
FIG. 6 shows a flowchart of a tracking method in a further exemplary embodiment.

At S1, the mains voltage $U_{AC}$ and the feed-in current $I_{AC}$ are measured. A required minimum voltage $U_{min}$ is determined on the basis of these two values.

At S2, the intermediate circuit voltage $U_{ZW}$ is measured or alternatively determined on the basis of the up-to-date setpoint value for the intermediate circuit voltage $U_{ZW}$, and this is compared, at S3, with the minimum voltage $U_{min}$. If the interval between the intermediate circuit voltage $U_{ZW}$ and the minimum voltage $U_{min}$ is less than a predetermined value, the method branches off to S5; otherwise the method continues at S4. The predetermined interval is in this case determined in the method illustrated by means of a factor x of a standard increment $\Delta U°$ for the tracking method. The value of the factor x can be, for example, x=3.

At S4, i.e., the case in which the intermediate circuit voltage $U_{ZW}$ is greater than the minimum voltage $U_{min}$ by more than the value x times $\Delta U_0$, the value $\Delta U_0$ is used as the increment for the tracking method $\Delta U$. At the same time a flag S is set to the value zero. At S5, on the other hand, i.e., in the case in which the intermediate circuit voltage $U_{ZW}$ has come close to the minimum voltage $U_{min}$ by an interval x times $\Delta U_0$ or less, the increment $\Delta U_0$ is set to a fraction of the standardized increment $\Delta U_0$, wherein this fraction is predetermined by a factor 1/y. The value for y can be in the range of from 2 to 4, for example. In addition, the flag S is set to the value one.

At S6, one or more tracking steps are implemented, wherein the value $\Delta U$ is set as increment, and wherein a stepwise change of the setpoint value by this value $\Delta U$ is performed when the flag S=0, and a ramped change of the setpoint value is performed when the flag has the value S=1.

A small increment of the differential voltage $\Delta U$ and also a ramped change of the setpoint value, as result from S5, slow down the tracking method and in particular its response time to changes in radiation. However, owing to the query at S3, this only occurs in a "critical" range of the intermediate circuit voltage $U_{ZW}$ in the vicinity of the minimum voltage $U_{min}$. The available intermediate circuit voltage range is thus used to the maximum towards the bottom of the range, as a result of which, in particular, a feed-in of PV power is made possible even at very low radiation intensities. Nevertheless, the tracking method in the upper, uncritical range of the intermediate circuit voltage has a quick response capability to a change of the optimum working point.

Once one or more of the tracking acts have been implemented, the method branches back to S2 in order to reset the increment $\Delta U$ or the flag S, possibly starting from a newly measured value for the intermediate circuit voltage $U_{ZW}$. Furthermore, provision can be made for there to be no branch back to S2 at regular intervals, for example, after implementation of a certain number of tracking steps, but back to S1, as a result of which the value of the minimum voltage $U_{min}$ is also regularly updated on the basis of the up-to-date mains voltage $U_{AC}$ and the up-to-date feed-in current $I_{AC}$. Particularly advantageous in one embodiment is calculation and updating of the minimum voltage $U_{min}$ independently of the illustrated sequence in the context of the current regulation, which is implemented at a much higher frequency than the voltage tracking. Such updating provides the advantage that always a minimum voltage $U_{min}$ necessary for an up-to-date power is taken into consideration adaptively and a constant minimum voltage necessary for a high feed power is not assumed as is done in the prior art.

A further example embodiment of a tracking method is illustrated below on the basis of its response in the event of a variation of the radiation intensity over the course of a typical day.

At night, i.e., when there is no solar radiation and no PV power available, the off-load voltage of the PV generator is clearly below the required voltage that would be required for feeding-in given an at least possible mains voltage; the inverter is usually deactivated.

In the morning, in the case of increasing solar radiation and still a very low PV power, the inverter is activated and determines, from the up-to-date mains voltage $U_{AC}$, the minimum voltage $U_{min}$, i.e., the intermediate circuit voltage which is at least required for feeding-in.

As the solar radiation increases further both the PV power and the off-load voltage of the PV generator increases further. As soon as the minimum voltage $U_{min}$ is exceeded, both clocking of an inverter bridge of the inverter for feeding into the electrical grid and the tracking method with voltage increments of a low level ΔU (for example, 1 volt) optionally with a limited rate of change are activated.

As the solar radiation increases further, both the PV power and the off-load voltage increase further, but the intermediate circuit voltage $U_{ZW}$ is for a start kept at or in the range of the minimum voltage $U_{min}$ by the tracking method. In addition, corresponding to the increasing power, the value of the minimum voltage can be checked continuously and possibly updated.

In the case of a further increasing level of solar radiation, the voltage at which the optimum working point of the PV generator is also exceeds the minimum voltage $U_{min}$, in which case the tracking method increases the intermediate circuit voltage $U_{ZW}$ corresponding to the optimum working point. The greater the amount by which the intermediate circuit voltage $U_{ZW}$ exceeds the minimum voltage $U_{min}$ is, the greater both the level ΔU of the voltage increments during the tracking method and the rates of change of the setpoint values can be selected to be until standard values are reached. Alternatively, as an example embodiment shown in FIG. 6, an interval value can be defined in order to define an interval between the intermediate circuit voltage $U_{ZW}$ and the minimum voltage $U_{min}$, above which interval the system is switched over from an optimized operation in accordance with the disclosure to a standard operation, i.e., tracking with relatively large stepwise voltage increments (for example, 10 V).

The chronological sequence at the end of the day, i.e., when the radiation reduces and therefore the voltage reduces at the optimum working point and the intermediate circuit voltage $U_{ZW}$ decreases has a reciprocal profile. In this case, provision can be made for the mains voltage $U_{AC}$ to be monitored during the entire procedure and for the minimum voltage $U_{min}$ to be updated in response to changes in the mains voltage, if appropriate.

The invention claimed is:

1. A tracking method for a voltage converter, in particular an inverter, of a photovoltaic system, for tracking a working point of a PV generator, comprising:
changing an intermediate circuit voltage by voltage increments of a predetermined level in a direction towards a lower or a higher voltage; and
limiting a mean rate of change of the intermediate circuit voltage in a subperiod between two voltage increments by a maximum mean rate of change, wherein the maximum mean rate of change is determined depending on a level of a voltage difference between the intermediate circuit voltage and a minimum required intermediate circuit voltage.

2. The tracking method of claim 1, wherein the maximum mean rate of change decreases as the level of the voltage difference decreases.

3. The tracking method of claim 2, wherein the maximum mean rate of change is constant above a fixed intermediate circuit voltage.

4. The tracking method of claim 1, wherein the minimum required intermediate circuit voltage is determined based on a mains voltage.

5. The tracking method of claim 4, wherein the minimum required intermediate circuit voltage is further determined based on a feed-in current.

6. The tracking method of claim 1, wherein the minimum required intermediate circuit voltage is updated regularly.

7. The tracking method of claim 6, wherein the updating of the minimum required intermediate circuit voltage is performed more frequently than the voltage increments by an integer multiple.

8. The tracking method of claim 1, wherein a level of the voltage increments is determined depending on a level of the intermediate circuit voltage.

9. The tracking method of claim 1, wherein a setpoint value for the intermediate circuit voltage is provided as a continuous function with a finite rate of change.

10. The tracking method of claim 9, wherein changes in the setpoint value are provided with a ramp function.

11. The tracking method of claim 1, wherein the maximum mean rate of change is determined by means of an update rate for a control of a current fed-in by the inverter into an AC voltage grid.

12. A tracking device for an inverter for use in a photovoltaic (PV) generation system, for tracking a working point of a PV generator in the PV generation system, comprising:
first input ports configured to receive an intermediate circuit voltage associated with the inverter; and
second input ports configured to receive an electric power associated with an output power of the PV Generator,
wherein the tracking device is configured to:
determine a setpoint value of the intermediate circuit voltage based on the received intermediate circuit voltage and electric power;
change the intermediate circuit voltage by voltage increments of a predetermined level in a direction towards a lower or a higher voltage based on the determined setpoint; and
limit a mean rate of change of the intermediate circuit voltage in a subperiod between two voltage increments by a maximum mean rate of change, wherein the maximum mean rate of change is determined depending on a level of a voltage difference between the intermediate circuit voltage and a minimum required intermediate circuit voltage.

13. The inverter of claim 12, wherein the maximum mean rate of change decreases as the level of the voltage difference decreases.

14. The inverter of claim 13, wherein the maximum mean rate of change is constant above a fixed intermediate circuit voltage.

15. The inverter of claim 12, wherein the minimum required intermediate circuit voltage is determined based on a mains voltage.

16. The inverter of claim 15, wherein the minimum required intermediate circuit voltage is further determined based on a feed-in current.

17. The inverter of claim 12, wherein a level of the voltage increments is determined depending on a level of the intermediate circuit voltage.

* * * * *